United States Patent [19]

Straw et al.

[11] Patent Number: 4,980,085

[45] Date of Patent: Dec. 25, 1990

[54] APPARATUS FOR MAKING POST-FOAMING GELS AND METHOD

[75] Inventors: Alan Straw, Cheshire; Roger D. Ellis, Lancashire, both of Great Britain

[73] Assignee: Colgate-Palmolive Company, New York, N.Y.

[21] Appl. No.: 346,728

[22] Filed: May 3, 1989

Related U.S. Application Data

[62] Division of Ser. No. 131,203, Dec. 10, 1987, Pat. No. 4,857,241.

[51] Int. Cl.[5] .............................................. B01J 13/00

[52] U.S. Cl. ........................................ 252/314; 141/3; 252/305; 252/90

[58] Field of Search .............. 252/305, 90, 314, 315.3, 252/315.4; 261/DIG. 26; 141/3

[56] References Cited

U.S. PATENT DOCUMENTS

| | | | |
|---|---|---|---|
| 3,541,581 | 11/1970 | Monson | 252/305 |
| 3,705,855 | 12/1972 | Marschner | 252/90 |
| 4,405,489 | 9/1983 | Sisbarro | 252/315.4 |
| 4,589,452 | 5/1986 | Clanet | 141/3 |
| 4,727,914 | 3/1988 | Anderson, III et al. | 141/105 |
| 4,753,747 | 6/1988 | Clark et al. | 252/90 |

FOREIGN PATENT DOCUMENTS

| | | | |
|---|---|---|---|
| WO0001876 | 3/1988 | PCT Int'l Appl. | 252/315.4 |

OTHER PUBLICATIONS

Derwent Abstract, 72-21477T/14.

*Primary Examiner*—Richard D. Lovering
*Assistant Examiner*—Daniel S. Metzmaier
*Attorney, Agent, or Firm*—Richard Ancel; Murray Grill; Powell Sprunger

[57] ABSTRACT

An apparatus for making post-foaming gels comprising, a piston chamber having an outer case defining a chamber, a piston being slidably received in the case and separating the chamber into a first compartment adjacent one end of the case for retaining a gel base, and a second compartment adjacent the other end of the case for retaining a compressed gas, with said piston having a hollow stem extending out of the other end of the case. The apparatus has a device for circulating the gel base through the stem and first compartment, and a device for introducing a foaming agent to the gel base while it is being circulated through the piston chamber.

3 Claims, 1 Drawing Sheet

APPARATUS FOR MAKING POST-FOAMING GELS AND METHOD

This is a division of application Ser. No. 131,203, filed on Dec. 10, 1987, now U.S. Pat. No. 4,857,241.

BACKGROUND OF THE INVENTION

The present invention relates to an apparatus and method for making a post-foaming gel.

Before the present invention, attempts have been made to add foaming agents, commonly low pressure propellant mixtures, such as pentane/butane mixtures to gel bases in conventional partly-filled pressure vessels to make a post-foaming gel. However, any post-foaming gel of cosmetically acceptable stiffness will tend to foam spontaneously when exposed to atmospheric pressure if it contains bubbles of air or hydrocarbon. These act as nuclei for foaming, by expanding and shearing the gel in their immediate vicinity. This means that pentane/butane mixtures cannot be incorporated into gel base in a conventional, partly filled pressure vessel, even when the headspace is pressurised with air or nitrogen. Inevitably some of the water-insoluble gas will be entrained in the gel. The resulting spontaneous foaming makes filling into cans very difficult and messy. Even then the product will not settle down on storage to give a satisfactory result.

Taking a potentially 'easy' situation, such as adding only isopentane (B.Pt. 29° C.) or n-pentane (B. PT. 37° C.), there are still problems. Assuming a good gel is produced by cold mixing, at temperatures around 20° C. the mixing does vaporise significant amounts of foaming agent and the resulting gel is foamy.

These bubbly gels are not suitable for packing into cans because the external propellant used with the cans gives insufficient pressure to collapse the bubbles on storage. This is largely due to the fact that these gels have a yield value such that they resist the applied pressure (or fail to transmit the full effect to the bubbles).

A post-foaming gel is disclosed in U.S. Pat. No. 3,541,581. A continuous method and apparatus to make a post-forming gel is disclosed in U.S. Pat. No. 4,405,489. The filling of an aerosol can containing an interior plastic bag which holds the product to be dispensed is disclosed in U.S. Pat. No. 4,589,452.

SUMMARY OF THE INVENTION

A principal feature of the present invention is the provision of an apparatus for making a post-foaming gel.

The apparatus of the present invention comprises, a piston chamber having an outer case defining a chamber, a piston being slidably received in the case and separating the chamber into a first compartment adjacent one end of the case for retaining a gel base, and a second compartment adjacent to the other end of the case for retaining a compressed gas, with the piston having a hollow stem extending out of the other end of the case. The apparatus has means for circulating the gel base through the stem and first compartment, and means for introducing a foaming agent to the gel base being circulated through the piston chamber.

A feature of the present invention is that the piston moves to permit expansion of the first compartment during introduction of the foaming agent.

Another feature of the invention is that the circulating means may circulate the gel base in opposite directions through the piston chamber, to ensure thorough mixing.

Still Another feature of the invention is the provision of means for introducing the gel base into the piston chamber.

Yet another feature of the invention is the provision of a heat exchanger for passing the gel base between the circulating means and piston chamber.

A further feature of the invention is the provision of means for adjusting the gas pressure on the piston in the second compartment to permit expansion of the first compartment during introduction of the foaming agent.

A further feature of the invention is the provision of means for expelling the formed gel from the piston chamber.

Another feature of the invention is the provision of a pressure vessel between the circulating means and piston chamber.

Another feature of the invention is that the pressure vessel may include an agitator for agitating the gel base and foaming agent.

Still another feature of the invention is the provision of methods for making the post-foaming gel of the present invention.

Further features will become more fully apparent in the following description of the embodiments of this invention and from the appended claims.

DESCRIPTION OF THE PREFERRED EMBODIMENTS

Figure 1:
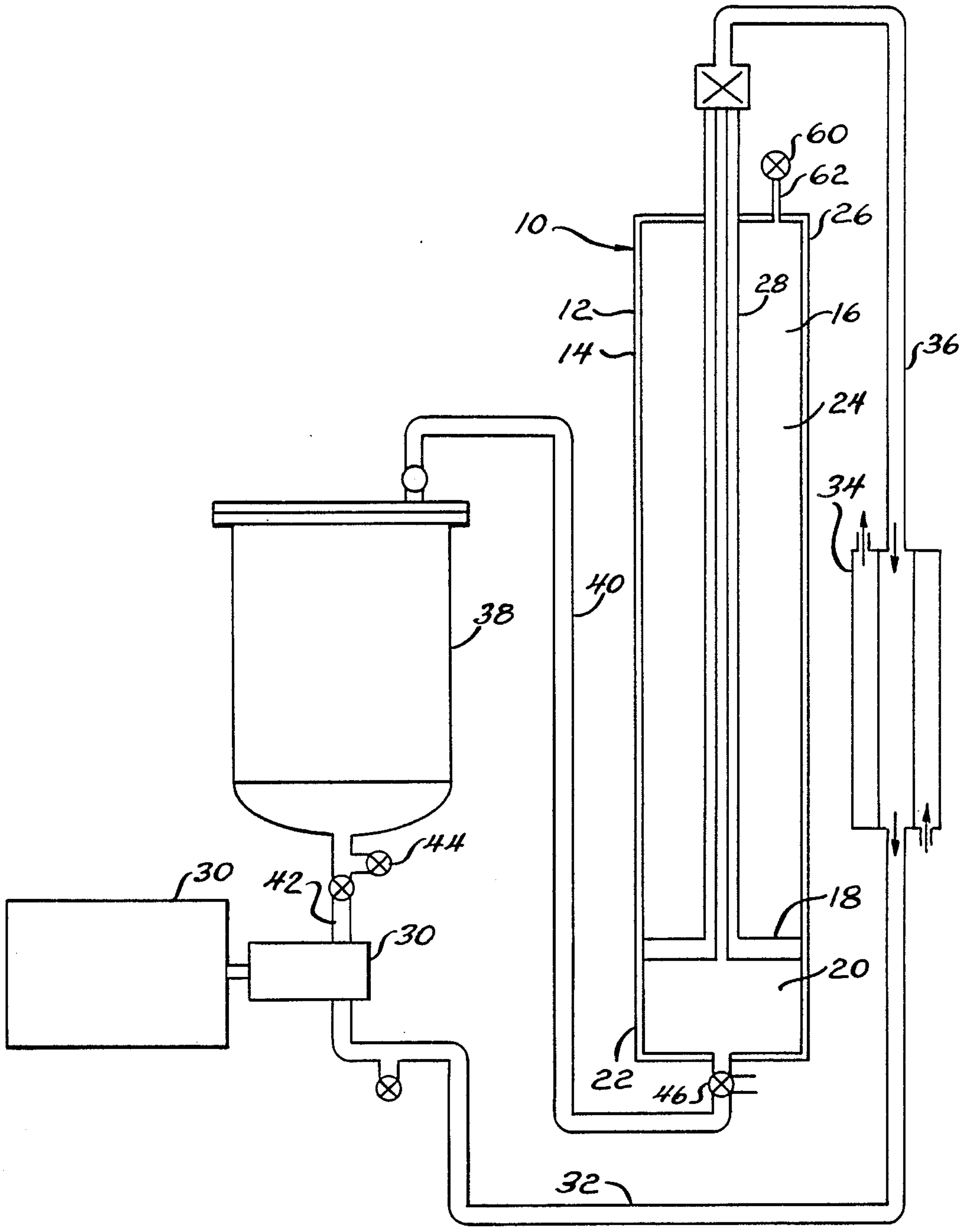
FIG. 1 is a diagrammatic view of an apparatus for making post-foaming gels of the present invention.

Referring now to FIG. 1, there is shown an apparatus generally designated 10 for making a post-foaming gel from a gel base and foaming agent according to the present invention. The apparatus 10 has a piston chamber 12 having an outer case 14 defining a chamber 16. The piston chamber 12 has a piston 18 being slidably received in the case 14, and separating the chamber 16 into a first compartment 20 adjacent one end 22 of the case 14 for retaining a gel base, and a second compartment 24 adjacent to the other end 26 of the case 14 for retaining a compressed gas, such as $N_2$ or air. The piston 18 has a hollow stem 28 slidably received and extending out of the other end 26 of the case 14. The apparatus 10 has a valve 60 and conduit 62 connected to the second compartment 24 to selectively introduce and remove compressed gas to and from the second compartment 24.

The apparatus 10 has a circulating device 30, such as a pump, for circulating the gel base in opposite directions through the piston chamber 12. The apparatus 10 has an elongated conduit 32 extending from the circulating device 30 to a heat exchanger 34, and an elongated conduit 36 extending between the heat exchanger 34 and the stem 28 of the piston 18. In a preferred form the apparatus 10 has a pressure vessel 38 with agitator connected to the first compartment 20 of the piston chamber 12 by an elongated conduit 40, and connected to the circulating device 30 by a conduit 42. The apparatus 10 has a first valve 44 intermediate the pressure vessel 38 and circulating device 30 for a purpose which will be described below. The apparatus 10 also has a second valve 46 located in the conduit 40 adjacent the piston chamber 12 for a purpose which will be described below.

Initially, a suitable gel base is made in an apparatus capable of providing heating, cooling, and vacuum and mixing while eliminating entrained air. The manner of making the gel base is described in the steps as follows, according to the formulation set forth below:

(1) Add approximately 20% of the water to a closed mixing vessel.

(2) Add fatty acid to the mixing vessel and then the GMS/color then heat to 80°-85° C. until all powders are molten.

(3) Add the triethanolamine to the vessel with agitation to form a soap. Cool to 60° C. Add the Hydroxyethyl cellulose.

(4) Cool to 40° C. and add the hydroxypropyl cellulose.

(5) Add the sorbitol solution, with agitation, to the aqueous soap.

(6) Cool the mixture to 30° C., add the perfume with agitation.

A typical formulation for the gel base is set forth as follows:

| BASE | % |
|---|---|
| Palmitic Acid | 8.0-10.0 |
| Stearic Acid | 1.0-3.0 |
| Triethanolamine | 5.5-7.5 |
| Sorbitol—70% solution | up to 3.0 |
| Hydroxyethyl cellulose | 0.1-0.4 |
| Hydroxypropyl cellulose | 0.05-0.15 |
| Glyceryl Monostearate | 0.4-0.6 |
| Perfume | q.s. |
| Coloring Material | q.s. |
| Water | to 100% |

Also, a typical formulation of the post-foaming gel is described as follows:

| FINISHED PRODUCT | |
|---|---|
| Base as above | 97.0-98.0 |
| Iso-Pentane | 1.5-1.8 |
| Iso-Butane | 0.5-1.2 |

Once the gel base has been made, the apparatus 10 operates in the following manner. First, the conduit 36 is disconnected adjacent the other end 26 of the piston chamber 12, and the gel base is pumped into the system at 30°-50° C. while taking care to displace all air in the system. The first compartment 20 of the piston chamber 12 is filled to a level chosen to give a particular batch size of a post-foaming gel, while the piston 18 slides in the case 14. Once the gel base has been filled into the system, the circulating device 30 and agitator of the pressure vessel 38 are activated, after which the foaming agent (iso-pentane and iso-butane) are added slowly through the valve 44 from a dosing cylinder to the system. The air pressure in the second compartment 24 on the piston 18 is adjusted to allow hydraulic expansion due to addition of the hydrocarbon mixture whilst prohibiting vaporization of the latter. Depending upon temperature, pressures up to 60 p.s.i. may be needed to accomplish this result. After the gel base and foaming agent have been circulated backwards and forwards through the system for a sufficient time by the circulating device 30 through the system, the foaming agent is emulsified and the batch is cooled to room temperature, and the gas pressure in the second compartment 24 can be reduced to less than 10 p.s.i., often 1-3 p.s.i.. Under these conditions, the formed post-foaming gel may be expelled by the piston from the valve 46 in order to permit suitable cans to be filled easily under excellent control. The aerosol valve of the cans is crimped in place, and the outer compartment is gassed with a few grams of propellant and the samples are ready for use. As required, the gel in the pressure vessel 38 can be pumped into the piston chamber 12, for filling into the cans.

In an alternative form, vacuum may be applied to the system to remove all air prior to filling of the gel base. Also, if desired, the pressure vessel 38 may be eliminated, while insuring excellent turbulant mixing being maintained in the piston chamber. Also, the conduit diameter may be increased to improve circulation properties of the system.

In this manner, a post-foaming gel is made from a gel base and foaming agent by the above described apparatus. A method for making the post-foaming gel according to the present invention comprises the steps of placing a gel base into a pistom chamber while introducing a foaming agent to the gel base and while permitting expansion to accomodate the foaming agent in the piston chamber.

The foregoing detailed description is given for clearness of understanding only, and no unnecessary limitations should be understood therefrom, as modifications will be obvious to those skilled in the art.

What is claimed is:

1. A method of making a post-foaming gel, comprising the steps of:

placing a gel base into a first compartment of a piston chamber while pressurizing with gas a second compartment separated from the first compartment by a slidable piston; and circulating the gel base through the first compartment of the piston chamber and a hollow stem extending from the piston and communicating with the first compartment while introducing a foaming agent to the gel base and while permitting expansion of the first compartment by the piston to accommodate the foaming agent in the piston chamber.

2. The method of claim 1 including the step of circulating the gel base in opposite directions through the piston chamber.

3. The method of claim 1 including the step of providing a pressure vessel for the circulated gel base and foaming agent.

* * * * *